(12) United States Patent  
McCune et al.

(10) Patent No.: US 9,657,572 B2  
(45) Date of Patent: May 23, 2017

(54) RING GEAR MOUNTING ARRANGEMENT WITH OIL SCAVENGE SCHEME

(71) Applicant: UNITED TECHNOLOGIES CORPORATION, Hartford, CT (US)

(72) Inventors: Michael E. McCune, Colchester, CT (US); Lawrence E. Portlock, Bethany, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 230 days.

(21) Appl. No.: 14/287,813

(22) Filed: May 27, 2014

(65) Prior Publication Data

US 2015/0252672 A1 Sep. 10, 2015

Related U.S. Application Data

(63) Continuation of application No. 11/504,220, filed on Aug. 15, 2006, now Pat. No. 8,753,243.

(51) Int. Cl.
*F16D 1/076* (2006.01)
*F01D 5/02* (2006.01)
(Continued)

(52) U.S. Cl.
CPC ............... *F01D 5/027* (2013.01); *F02C 7/36* (2013.01); *F16D 1/076* (2013.01); *F16H 57/042* (2013.01); *F16H 57/0402* (2013.01); *F16H 57/043* (2013.01); *F16H 57/0421* (2013.01); *F16H 57/0458* (2013.01); *F16H 57/0482* (2013.01);
(Continued)

(58) Field of Classification Search
CPC .............................. F16H 57/042; F16D 1/076
See application file for complete search history.

(56) References Cited

U.S. PATENT DOCUMENTS 2,288,792 A 7/1942 Daniels
2,684,591 A 7/1954 Lundquist
(Continued)

FOREIGN PATENT DOCUMENTS

CN 1952435 A 4/2007
EP 1114949 7/2001
(Continued)

OTHER PUBLICATIONS

Japanese Office Action for Japanese Application No. 2007-202444, Aug. 3, 2010.
(Continued)

*Primary Examiner* — Derek D Knight
(74) *Attorney, Agent, or Firm* — Carlson, Gaskey & Olds, P.C.

(57) ABSTRACT

In one exemplary embodiment, an epicyclic gear train for a turbine engine includes a first shaft that is rotatable about an axis. A ring gear includes first and second portions each having an inner periphery with teeth. The first and second portions are secured to one another at a radial interface. At least one of the first and second portions includes a flange that extends radially outward. The flange is fixed to the first shaft in an axial direction by a fastening element. A carrier supports star gears that mesh with the ring gear. A sun gear meshes with the star gears and is coupled to a second shaft.

7 Claims, 2 Drawing Sheets

(51) Int. Cl.
  *F16H 57/04* (2010.01)
  *F16H 57/08* (2006.01)
  *F02C 7/36* (2006.01)

(52) U.S. Cl.
  CPC ......... *F16H 57/08* (2013.01); *F05D 2240/70* (2013.01); *F05D 2260/34* (2013.01); *F05D 2260/40311* (2013.01); *Y10T 29/49462* (2015.01)

(56) References Cited

U.S. PATENT DOCUMENTS

| | | | |
|---|---|---|---|
| 3,160,026 | A | 12/1964 | Rosen |
| 3,287,906 | A | 11/1966 | McCormick |
| 3,352,178 | A | 11/1967 | Lindgren et al. |
| 3,722,323 | A | 3/1973 | Welch |
| 3,747,343 | A | 7/1973 | Rosen |
| 3,754,484 | A | 8/1973 | Roberts |
| 3,892,358 | A | 7/1975 | Gisslen |
| 4,130,872 | A | 12/1978 | Harloff |
| 4,583,413 | A * | 4/1986 | Lack ............ F16H 1/2809 475/159 |
| 4,896,499 | A | 1/1990 | Rice |
| 5,081,832 | A | 1/1992 | Mowill |
| 5,211,541 | A | 5/1993 | Fledderjohn et al. |
| 5,302,031 | A | 4/1994 | Yuasa |
| 5,391,125 | A | 2/1995 | Turra et al. |
| 5,433,674 | A | 7/1995 | Sheridan et al. |
| 5,447,411 | A | 9/1995 | Curley et al. |
| 5,466,198 | A | 11/1995 | McKibbine et al. |
| 5,472,383 | A | 12/1995 | McKibbin |
| 5,524,847 | A | 6/1996 | Brodell et al. |
| 5,778,659 | A | 7/1998 | Duesler et al. |
| 5,857,836 | A | 1/1999 | Stickler et al. |
| 5,915,917 | A | 6/1999 | Eveker et al. |
| 5,975,841 | A | 11/1999 | Lindemuth et al. |
| 6,158,210 | A | 12/2000 | Orlando |
| 6,223,616 | B1 | 5/2001 | Sheridan |
| 6,318,070 | B1 | 11/2001 | Rey et al. |
| 6,402,654 | B1 | 6/2002 | Lanzon et al. |
| 6,530,858 | B1 | 3/2003 | Uroso et al. |
| 6,669,597 | B1 | 12/2003 | Uroso et al. |
| 6,732,502 | B2 | 5/2004 | Seda et al. |
| 6,814,541 | B2 | 11/2004 | Evans et al. |
| 7,021,042 | B2 | 4/2006 | Law |
| 7,591,754 | B2 | 9/2009 | Duong et al. |
| 7,662,059 | B2 | 2/2010 | McCune |
| 7,704,178 | B2 | 4/2010 | Sheridan et al. |
| 7,824,305 | B2 | 11/2010 | Duong et al. |
| 7,926,260 | B2 | 4/2011 | Sheridan et al. |
| 7,950,151 | B2 | 5/2011 | Duong et al. |
| 8,074,440 | B2 | 12/2011 | Kohlenberg |
| 8,205,432 | B2 | 6/2012 | Sheridan |
| 2002/0064232 | A1 | 5/2002 | Toda et al. |
| 2002/0064327 | A1 | 5/2002 | Toda et al. |
| 2004/0112041 | A1 | 6/2004 | Law |
| 2005/0026745 | A1* | 2/2005 | Mitrovic ............ F16H 1/2836 475/348 |
| 2007/0225111 | A1 | 9/2007 | Duong et al. |
| 2008/0006018 | A1 | 1/2008 | Sheridan et al. |
| 2008/0044276 | A1 | 2/2008 | McCune et al. |
| 2008/0096714 | A1 | 4/2008 | McCune |
| 2008/0116009 | A1 | 5/2008 | Sheridan et al. |
| 2009/0053058 | A1 | 2/2009 | Kohlenberg et al. |
| 2009/0056306 | A1 | 3/2009 | SuciuGabriel |
| 2009/0081039 | A1 | 3/2009 | McCune et al. |
| 2009/0090096 | A1 | 4/2009 | Sheridan |
| 2009/0111639 | A1 | 4/2009 | Klingels |
| 2009/0293278 | A1 | 12/2009 | Duong et al. |
| 2009/0298640 | A1 | 12/2009 | Duong et al. |
| 2009/0314881 | A1 | 12/2009 | Suciu et al. |
| 2010/0148396 | A1 | 6/2010 | Xie et al. |
| 2010/0331139 | A1 | 12/2010 | McCune |
| 2011/0130246 | A1 | 6/2011 | McCune |
| 2012/0243971 | A1 | 9/2012 | McCune et al. |
| 2012/0275904 | A1 | 11/2012 | McCune et al. |
| 2013/0023378 | A1 | 1/2013 | McCune et al. |
| 2014/0154054 | A1 | 6/2014 | Sheridan et al. |
| 2014/0230403 | A1 | 8/2014 | Merry et al. |
| 2015/0065285 | A1 | 3/2015 | McCune et al. |

FOREIGN PATENT DOCUMENTS

| | | |
|---|---|---|
| EP | 1876338 A2 | 1/2008 |
| EP | 1890054 A1 | 2/2008 |
| EP | 1925855 A2 | 5/2008 |
| EP | 2224100 | 9/2010 |
| EP | 2559913 A1 | 2/2013 |
| EP | 2610463 | 7/2013 |
| FR | 1357038 | 4/1964 |
| GB | 1516041 | 6/1978 |
| GB | 2041090 | 9/1980 |
| JP | 46-36927 | 10/1971 |
| JP | 5-248267 A | 9/1993 |
| JP | 9-317833 A | 12/1997 |
| JP | 2001-208146 A | 8/2001 |
| JP | 39-20031 B2 | 5/2007 |
| WO | 2007038674 | 4/2007 |
| WO | 2013147951 | 10/2013 |
| WO | 2015017041 A1 | 2/2015 |

OTHER PUBLICATIONS

European Search Report for EP Application No. 07253078.5, Dec. 5, 2007.
Dudley ("Gear Handbook: The design, Manufacture, and Application of Gears", p. 3-15).
European Search Report and Written Opinion for European Application No. EP 12 19 8136 completed on Aug. 21, 2013.
International Search Report and Written Opinion for International Application No. PCT/US2012/071906 completed on Aug. 22, 2013.
International Preliminary Report on Patentability for PCT Application No. PCT/US2012/071906 mailed Jul. 24, 2014.
Zalud, "Gears Put a New Spin on Turbofan Performance" Machine Design, Nov. 5, 1998, 2010Penton Media, Inc., Abstract and pp. 1-4.
Kandebo; Geared-Turbofan Engine Design Targets Cost, Complexity, Aviation Week & Space Technology; New York; Feb. 23, 1998, pp. 32-34.
Hendricks et al, "Performance and Weight Estimates for an Advanced Open Rotor Engine" NASA/ TM-2012-217710, Sep. 2012, 20 pp.
Jane's Aero-Engines, Issue Seven, Mar. 2000, pp. 510-512.
Meier, N (2005) Civil Turbojet/Turbofan Specifications. Retrieved from http://jet-engine.net/civtfspec.html.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.
European Search Report for European Patent Application No. 12198045.2 completed Sep. 7, 2015.
Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida.

(56) References Cited

OTHER PUBLICATIONS

Agarwal, B.D and Broutman, L.J. (1990). Analysis and performance of fiber composites, 2nd Edition. John Wiley & Sons, Inc. New York: New York.
Carney, K., Pereira, M. Revilock, and Matheny, P. Jet engine fan blade containment using two alternate geometries. 4th European LS-DYNA Users Conference.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report. NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston, L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc.
Ratna, D. (2009). Handbook of thermoset resins. Shawbury, UK: iSmithers.
Wendus, B.E., Stark, D.F., Holler, R.P., and Funkhouser, M.E. (2003). Follow-on technology requirement study for advanced subsonic transport. NASA/CR-2003-212467.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.
Dickey, T.A. and Dobak, E.R. (1972). The evolution and development status of ALF 502 turbofan engine. National Aerospace Engineering and Manufacturing Meeting. San Diego, California. Oct. 2-5, 1972.
Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
Extended European Search Report for European Application No. 16171476.1 mailed Oct. 6, 2016.
European Search Report for European Application No. 16174068.3 mailed Nov. 22, 2016.
European Search Report for European Application No. 16183877.6 mailed Jan. 5, 2017.
Petition for Inter Partes Review of U.S. Pat. No. 8,894,538. *General Electric Company*, Petitioner, v. *United Technologies Corporation*, Patent Owner. Filed Mar. 1, 2017.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).

\* cited by examiner

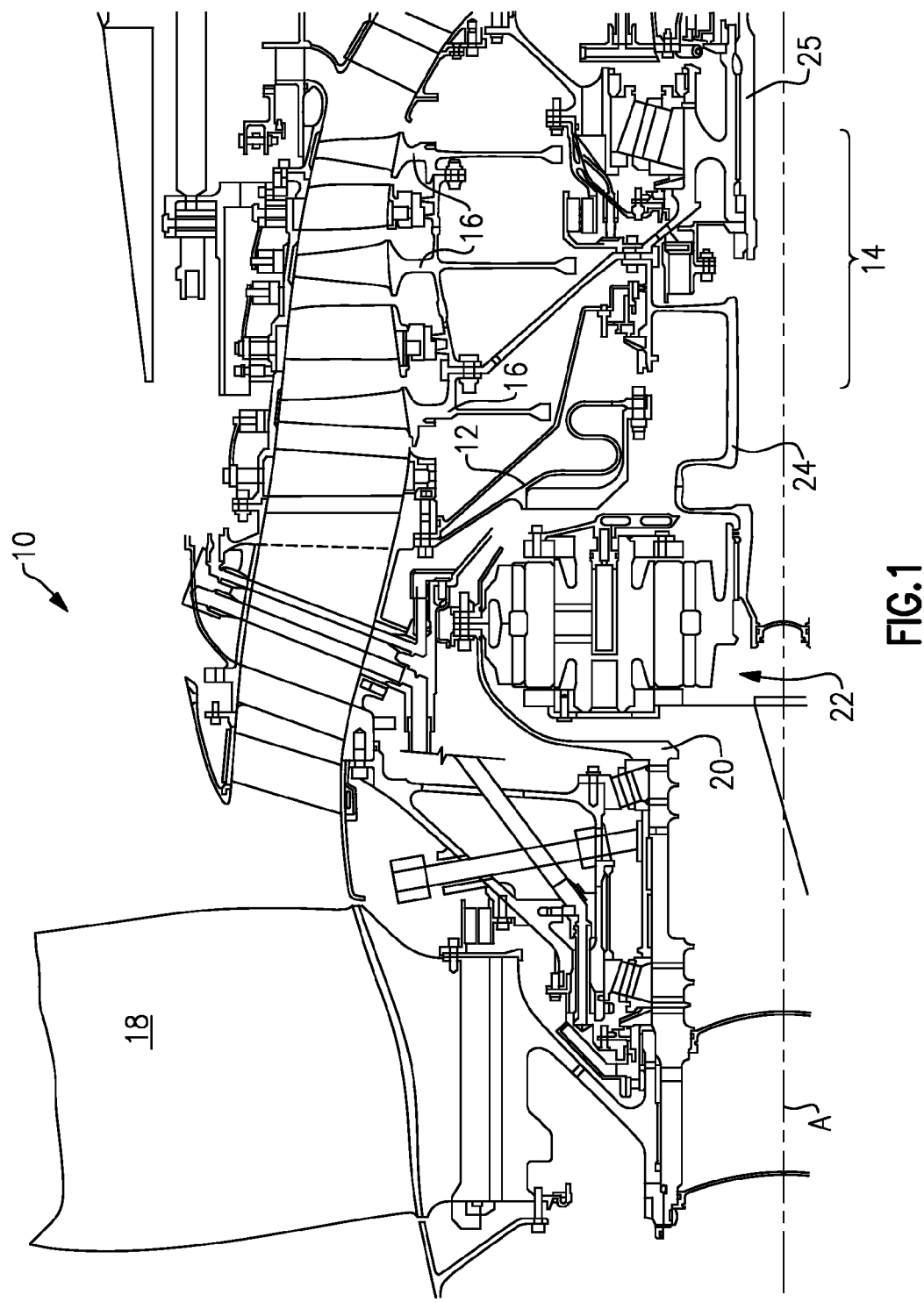

RING GEAR MOUNTING ARRANGEMENT WITH OIL SCAVENGE SCHEME

REFERENCE TO RELATED APPLICATIONS

This application is a continuation of U.S. patent application Ser. No. 11/504,220, filed on 15 Aug. 2006.

BACKGROUND OF THE INVENTION

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY OF THE INVENTION

In one exemplary embodiment, an epicyclic gear train for a turbine engine includes a first shaft that is rotatable about an axis. A ring gear includes first and second portions each having an inner periphery with teeth. The first and second portions are secured to one another at a radial interface. At least one of the first and second portions includes a flange that extends radially outward. The flange is fixed to the first shaft in an axial direction by a fastening element. A carrier supports star gears that mesh with the ring gear. A sun gear meshes with the star gears and is coupled to a second shaft.

In a further embodiment of the above, the teeth on the first portion are angled in a first direction. The teeth on the second portion are angled in a second direction opposite the first direction. A rotational direction of the ring gear forces the first and second portions toward one another at the radial interface.

In a further embodiment of any of the above, the first and second portions each have a generally S-shaped outer circumferential surface opposite the teeth that provide a first thickness and a second thickness axially inward from the first thickness. The second thickness is greater than the first thickness.

In a further embodiment of any of the above, the first and second portions each include a recess facing one another to provide an internal annular cavity.

In a further embodiment of any of the above, the flange and the teeth of at least one of the first and second portions provide a unitary structure.

BRIEF DESCRIPTION OF THE DRAWINGS

FIG. 1 is a partial cross-sectional view of a front portion of a gas turbine engine illustrating a turbo fan, epicyclic gear train and a compressor section.

DETAILED DESCRIPTION OF THE PREFERRED EMBODIMENT

Figure 4:
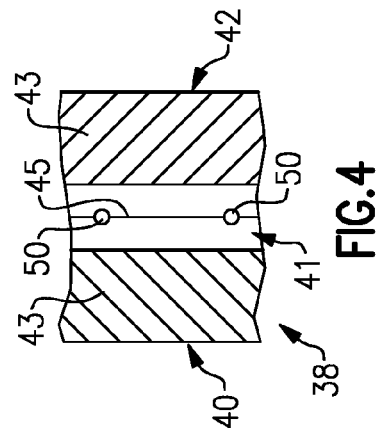
FIG. 4 is a view of the ring gear shown in FIG. 3 viewed in a direction that faces the teeth of the ring gear in FIG. 3.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22.

Figure 2:
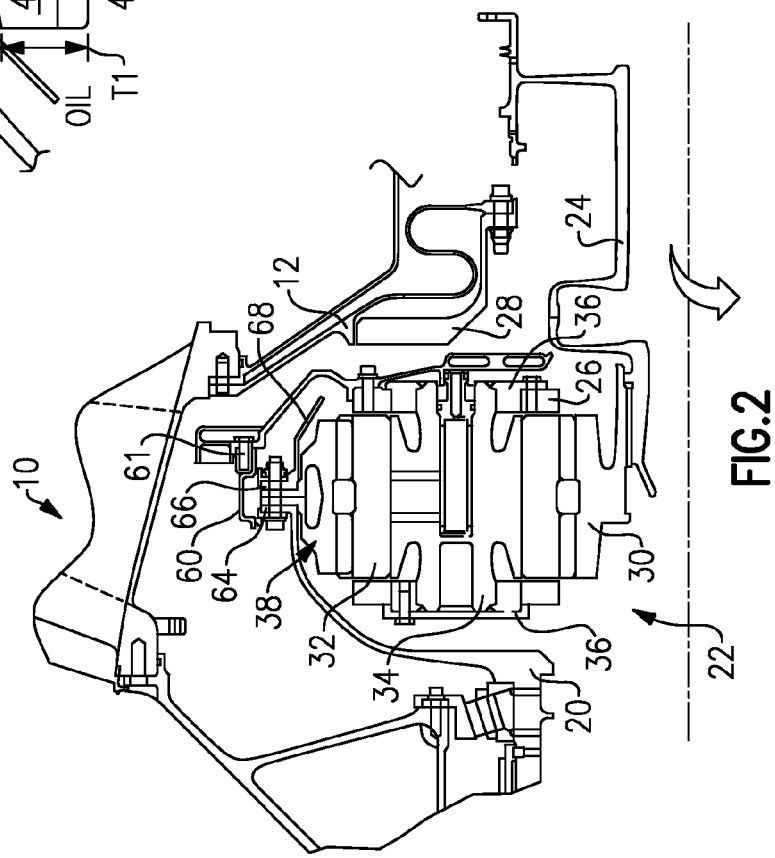
FIG. 2 is an enlarged cross-sectional view of the epicyclic gear train shown in FIG. 1.

In the example arrangement shown, the epicyclic gear train 22 is a star gear train. Referring to FIG. 2, the epicyclic gear train 22 includes a sun gear 30 that is connected to the compressor shaft 24, which provides rotational input, by a splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below.

Figure 3:
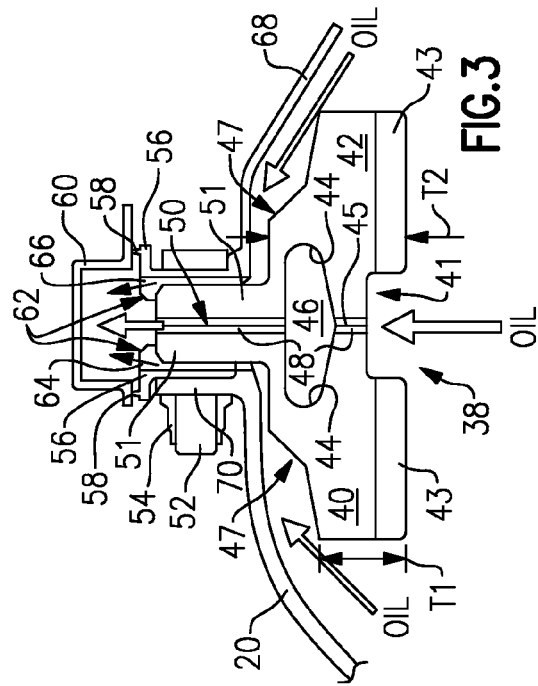
FIG. 3 is an enlarged cross-sectional view of an example ring gear similar to the arrangement shown in FIG. 2.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An epicyclic gear train for a turbine engine comprising:
   a first shaft rotatable about an axis;
   a ring gear including first and second portions each having an inner periphery with teeth, the first and second portions secured to one another at a radial interface, and at least one of the first and second portions including a flange extending radially outward, the flange fixed to the first shaft in an axial direction by a fastening element;
   a carrier supporting star gears that mesh with the ring gear; and
   a sun gear meshing with the star gears and coupled to a second shaft.

2. The epicyclic gear train according to claim 1, wherein the teeth on the first portion are angled in a first direction, and the teeth on the second portion are angled in a second direction opposite the first direction, a rotational direction of the ring gear forcing the first and second portions toward one another at the radial interface.

3. The epicyclic gear train according to claim 1, the first and second portions each have a generally S-shaped outer circumferential surface opposite the teeth that provide a first thickness and a second thickness axially inward from the first thickness, the second thickness greater than the first thickness.

4. The epicyclic gear train according to claim 3, wherein the first and second portions each include a recess facing one another to provide an internal annular cavity.

5. The epicyclic gear train according to claim 1, wherein the flange and the teeth of the at least one of the first and second portions provide a unitary structure.

6. The epicyclic gear train according to claim 5, wherein the fastening element is a nut and a bolt.

7. The epicyclic gear train according to claim 5, wherein the flange is axially constrained and affixed to the first shaft without splines.

\* \* \* \* \*